(12) United States Patent
Vig et al.

(10) Patent No.: US 10,956,250 B1
(45) Date of Patent: Mar. 23, 2021

(54) DATABASE INTERFACE TO OBTAIN ITEM STATE ON CONDITIONAL OPERATION FAILURE

(71) Applicant: Amazon Technologies, Inc., Seattle, WA (US)

(72) Inventors: Akshat Vig, Seattle, WA (US); Rashmi Krishnaiah Setty, Santa Clara, CA (US); Joon Ahn, Cupertino, CA (US); Somasundaram Perianayagam, Seattle, WA (US); Fahad Ahmed, Santa Clara, CA (US); Kapil Singh, Seattle, WA (US); Stefano Stefani, Issaquah, WA (US); Vaibhav Jain, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 172 days.

(21) Appl. No.: 16/364,045

(22) Filed: Mar. 25, 2019

(51) Int. Cl.
*G06F 11/07* (2006.01)
*G06F 16/176* (2019.01)
*G06F 16/84* (2019.01)

(52) U.S. Cl.
CPC ...... *G06F 11/0775* (2013.01); *G06F 11/0769* (2013.01); *G06F 11/0781* (2013.01); *G06F 16/1774* (2019.01); *G06F 16/86* (2019.01)

(58) Field of Classification Search
CPC ............ G06F 11/0775; G06F 11/0769; G06F 11/0781; G06F 16/86; G06F 16/1774
See application file for complete search history.

(56) References Cited

U.S. PATENT DOCUMENTS

| 6,189,785 | B1* | 2/2001 | Lowery | G06Q 20/04 235/379 |
|---|---|---|---|---|
| 8,266,126 | B2 | 9/2012 | Labuda et al. | |
| 8,788,472 | B2 | 7/2014 | Labuda | |
| 2004/0039742 | A1* | 2/2004 | Barsness | G06F 16/252 |
| 2006/0171405 | A1* | 8/2006 | Brendle | G06F 9/466 370/412 |
| 2009/0037437 | A1* | 2/2009 | Todd | H04L 67/14 |
| 2010/0228705 | A1* | 9/2010 | Labuda | G06F 16/23 707/700 |
| 2012/0117423 | A1* | 5/2012 | Andrade | G06F 11/1438 714/16 |

(Continued)

*Primary Examiner* — Matthew M Kim
*Assistant Examiner* — Matthew N Putaraksa
(74) *Attorney, Agent, or Firm* — Kowert, Hood, Munyon, Rankin & Goetzel, P.C.; Robert Kowert; Jeffrey Hood

(57) ABSTRACT

Systems and methods are provided to implement a database system configured to return the state of a data item upon failure of a condition check on the data item during a conditional write. In embodiments, a write request may specify an indicator to return the item state upon condition failure. The request may specify multiple database operations to execute as a transaction, where failure of a single condition check will cause the entire transaction to fail and an item state causing the failure to be returned. The returned state of the data item may include a selection of the item's attributes specified by the request. Advantageously, these features allow a client to easily obtain the precise cause of a write's failure. Moreover, because the item state is returned only when a conditional write fails and only when requested, the response size of most write requests remains unchanged.

20 Claims, 11 Drawing Sheets

(56) References Cited

U.S. PATENT DOCUMENTS

| | | | |
|---|---|---|---|
| 2014/0032608 A1* | 1/2014 | Comeau | G06F 16/252 707/802 |
| 2017/0078144 A1* | 3/2017 | Purusothaman | G06F 9/44505 |
| 2018/0196836 A1* | 7/2018 | Sundaram | G06F 16/2358 |
| 2018/0332325 A1 | 11/2018 | Kaitchuck | |
| 2020/0159845 A1* | 5/2020 | Xue | G06F 16/2343 |

* cited by examiner write request 210

```
"Update": {
    "TableName": "CheckingAccounts",        212
    "Key": {
        "AccountID": {
            "S": "Ganesh"
        }
    },
    "UpdateExpression":                      214
        "set Balance = Balance - :amt1",
    "ConditionExpression":
        "Balance >= :amt1",
    "ExpressionValues": {
        "amt1": { "N": "100" },
    },
    "ReturnValues": {                        216
        "ALL_NEW"
    },
    "ReturnValuesOnConditionFailure": {      218
        "Balance",
        "LastWithdrawAmount",
        "LastWithdrawMemo"
    }
}
``` condition check failure 220 → error response 230

```
"Error": {
    "Message": {                             232
        "S": "Condition check failed."
    },
    "Reason": {                              234
        "ErrorCode":
            "S": "ConditionFailed",
        "Attributes": {                      236
            "Balance": {
                "N": "30"
            },
            "LastWithdrawAmount": {
                "N": "120"
            },
            "LastWithdrawMemo": {
                "S": "Valentine's Day dinner"
            }
        }
    }
}
```

FIG. 2

```
                                                              transaction request
"Transaction": {                                                      510

"Update": {                                                       520
       "TableName": "Players",
       "Key": {
          "PlayerID": { "S": ":player" }
       },
       "UpdateExpression": "set Team = :team",
       "ConditionExpression": "Team IS_NULL and Age > 18",   522
       "ExpressionValues": {
          ":player": { "S": "Eric" },
          ":team": { "S": "Cowboys" }
       },
                                                                      524
       "ReturnValuesOnConditionFailure": {
          "ALL_CHECKED"
       }
    }, "Put": {                                                          530
       "TableName": "Teams",
       "Item": {
          "TeamID": { "S": ":team" },
          "PlayerID": { "S": ":player" }
       },
                                                                      532
       "ConditionExpression": "PlayerID <> :player",
       "ExpressionValues": {
          ":player": { "S": "Eric" },
          ":team": { "S": "Cowboys" }
       },
                                                                      534
       "ReturnValuesOnConditionFailure": {
          "ALL_OLD"
       }
    }
}
```

*FIG. 5A*

```
                                                       transaction response
                                                                      540
"ErrorResponse": {
------------------------------------------------------------------
    "Error": {                                                    550
        "Message": {
            "S": "Condition check failed when updating Players",
        }
        "Reason": {
            "ErrorCode": "S": "ConditionFailed",
            "TableName": "Players",
            "Attributes": {                                       552
                "Team": { "S": "Bears" },
                "Age": { "N": 25 }
            }
        },
------------------------------------------------------------------
    "Error": {                                                    560
        "Message": {
            "S": "Condition check failed when inserting to Teams",
        }
        "Reasons": {
            "ErrorCode": "S": "ConditionFailed",
            "TableName": "Teams",
            "Attributes": {                                       562
                "TeamID": { "S": "Bears" },
                "PlayerID": { "S": "Eric" },
                "Position": { "S": "Kicker" },
                "JoinDate": { "D": "2019-01-01" }
            }
        }
    }
}
```

DATABASE INTERFACE TO OBTAIN ITEM STATE ON CONDITIONAL OPERATION FAILURE

BACKGROUND

Database systems provide interfaces for performing operations on data managed by the database system. Some database systems allow users to specify conditional writes, where a write operation is only executed if a specified condition is verified to be true (for example, if a data item is in an expected state). Some database systems may provide a transaction interface that allows users to execute a set of database operations as an atomic transaction, according to all-or-nothing semantics. Accordingly, if any operation in a requested transaction fails, the entire transaction is cancelled. In these database systems, it is sometimes difficult for users to obtain immediate feedback regarding the reasons why their requests failed. While it is possible in some cases to manually examine the state of the data after the fact to investigate the cause of the failure, there is no guarantee that the data will remain unchanged after the request and that the failure can be reproduced from the later state of the data. Moreover, such manual investigations can be tedious and difficult, especially for large and complex database transactions, which may include a large number of condition checks. Improved database interfaces are needed to provide users on-demand and targeted item state information at the time of the request condition failure.

BRIEF DESCRIPTION OF THE DRAWINGS

FIG. 2 illustrates code for an example request and an example error response produced by a database system that returns an item state upon a condition failure, according to some embodiments.

FIGS. 5A and 5B illustrate code for an example transaction request and an example error response produced by a database system that returns an item state upon a condition failure, according to some embodiments.

Figure 1:
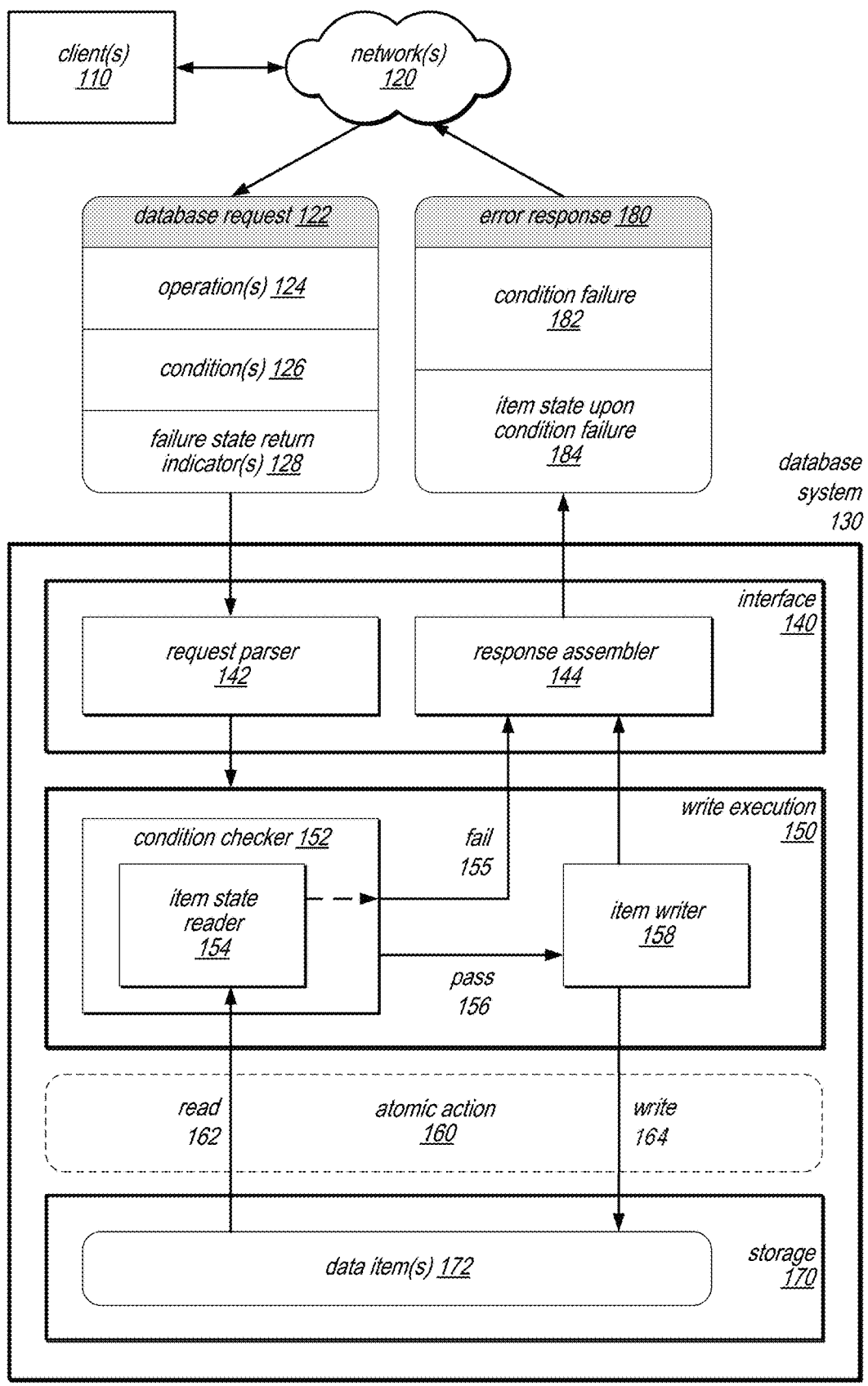
FIG. 1 is a block diagram illustrating an example database system that implements an interface to return an item state upon a condition failure, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement a database system with an interface configured to accept requests that specify conditional operations and return item states upon condition failures.

Database systems can offer many performance advantages to users. For example, in some embodiments, a database system can distribute data and the work to access the data amongst multiple storage locations, to provide a scalable, highly available, and highly performant storage system for a large number of users. Some database systems may allow users to specify conditional operations, where an operation is only executed if a specified condition is verified to be true (for example, if a data item is in an expected state). Some database systems may provide a transaction interface that allows users to specify a set of database operations as an atomic transaction, to be executed based on all-or-nothing semantics. Accordingly, if any operation in a requested transaction fails, the entire transaction is cancelled.

In some embodiments, one of the reasons for the failure of a request or the cancellation of a transaction may be the failure of a condition associated the request. For example, a request may specify that an update of a data item should proceed (e.g. to perform a balance transfer from an account) only if the data item satisfies a specified condition (e.g., if the account has sufficient funds). In some embodiments, the database system may natively support different types of conditional operations, which may guarantee that the condition check and the ensuing operation are executed as a single atomic operation. Depending on the embodiment, the database system may allow users to specify a variety of different conditions for operations.

In some embodiments, users of a database system may wish to see the state of the data (e.g., the state of the item that was checked or targeted by the write) at the time of a request condition failure. However, it is sometimes difficult for users to obtain immediate feedback regarding such information. While it is possible in some cases to manually read the state of the data after the failed request to investigate the cause of the failure, there is no guarantee that the data will remain unchanged after the request and that the later state of the data can reproduce the condition failure. Moreover, such investigations can be tedious and difficult, especially in the context of complex database transactions, which may include a large number of condition checks.

Accordingly, in some embodiments of the database system disclosed herein, the database system may provide an interface, such as a user-facing interface, an application programming interface (API) or a communication protocol, to allow users a specify a request with a condition and a failure state return (FSR) indicator. The request may be a request to conditionally add a data item to the database, update a data item in the database, or delete a data item in the database. In some embodiments, the FSR indicator may be specified as a flag or some other type of parameter that instructs the database system to return the state of a specified data item upon the failure of a condition. In some embodiments, the database system will guarantee that the returned item state is the state of the item that was evaluated to determine the condition failure, i.e., the state that caused the condition failure. For example, in some embodiments, returned item state may be the state of the data item when it was locked to perform the condition check or a transaction.

In some embodiments, the FSR indicator may include or be associated with other parameters, which may be optional. In some embodiments, a parameter may be specified to indicate what state data is returned upon a condition failure. For example, the FSR indicator may indicate to return all attributes (i.e., the entire state) of a data item. In some embodiments, the FSR indicator may be used to specify that only those attributes that were evaluated by the condition should be returned as part of the item state. In some embodiments, the request or FSR indicator may explicitly indicate a list of item attributes that should be returned.

In some embodiments, the FSR indicator may be specified as part of a database transaction of multiple database operations. In some embodiments, each individual operation in the transaction may include its own condition(s), and each individual condition may be associated with its own FSR indicator. In some embodiments, the transaction may include an explicit check operation to perform a condition check, which is logically specified as an individual operation in the transaction, but does not actually write any data in the database. In some embodiments, the check operation may include its own FSR indicator. In some embodiments, the database transaction may specify an FSR indicator for multiple operations, or a global FSR indicator for the entire transaction, which may return item states for multiple database operations upon the failure of a condition for an individual operation or a global condition for the entire transaction.

In some embodiments, in order to use the FSR feature, the user or client may need to be given specific database permissions. In some embodiments, the database system may implement a separate permission distinct from the normal read or write permissions to control access to returned item state. As may be understood, in some embodiments, routine writers of a database should not necessarily be allowed to examine the full state of the data that they are writing. In some embodiments, access to receive the item state may be granted only to a small set of administrators or system developers, to allow these users to administer or debug the database.

As may be understood to those skilled in the art, the database interface as described herein provides a number of technical benefits to improve the functioning of conventional database systems. In one respect, the disclosed database interface allows users to immediately obtain an item state of the database at the time of a request condition failure. In another respect, the failure state return may be requested via an FSR indicator parameter specified by the request or transaction request. Accordingly, the failure state information is only returned when it is requested by the user. Moreover, the failure state information is only returned when there is a condition failure. Thus, the failure state information is not returned indiscriminately for all database requests under normal circumstances. In this way, network and processing capacity for the database system is maintained for most normal requests, the security of the database is maintained. In yet another respect, the item state that is returned may be configurable by the user, for example, to return only a subset of attributes of the subject data item. This configurability allows to easily specify exactly what information is returned in response to the condition failure, without having to program the desired behavior using cumbersome programming languages. Additionally, the FSR feature allows users to easily associate particular return states with particular conditions. In some embodiments, the disclosed database interface is particular useful for database transactions, so that different database operations in a transaction may each specify their own individual return states. These and other features and benefits of the database system are described in more detail below, in connections with the figures.

FIG. 1 is a block diagram illustrating an example database system that implements an interface to return an item state upon a condition failure, according to some embodiments. As shown, the database system 130 may be accessed by client(s) 110 over one or more network(s) 120. In some embodiments, the database system 130 may be implemented as a network-based database service. In some embodiments, the database system 130 may be hosted on computing resources operated by a network-accessible service provider network, which may host a variety of different computing services. The client 110 may submit database requests, such as request 122, to the database system 130, and the database system 130 may respond to a request with an error response 180, as shown. In some embodiments, the database system may be NoSQL or non-relational database system.

In some embodiments, a given client 110 may include a suitable version of a web browser or a plug-in module for a web browser, or other type of code module configured to execute as an extension to or within an execution environment to provide access to the services provided by database system 130. Alternatively, a client 110 may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. In some embodiments, a client 110 may be an application configured to interact directly with the database system 130. In some embodiments, a client 110 may be configured to generate web service requests according to a Representational State Transfer (REST)-style web services architecture, a document- or message-based web services architecture, or another suitable web services architecture.

In some embodiments, the client 110 may be configured to provide access to database system 130 to other applications in a manner that is transparent to those applications. For example, a client 110 may be configured to integrate with an operating system or file system to provide storage in accordance with a suitable variant of the storage model described herein. In some embodiments, the operating system or file system may present a different storage interface to applications, such as a conventional file system hierarchy of files, directories and/or folders. In some embodiments, applications may not need to be modified to make use of the database system described herein. Instead, the details of interfacing to database system 130 may be coordinated by the client 110 and the operating system or file system on behalf of applications executing within the operating system environment.

As illustrated, the client(s) 110 may convey requests to and receive responses from the database system 130 via a network 120. In various embodiments, network 120 may encompass any suitable combination of networking hardware and protocols necessary to establish network communications between clients 110 and database system 130. For example, the network 120 may encompass the various telecommunications networks and service providers that collectively implement the Internet. Network 120 may also include private networks such as local area networks (LANs) or wide area networks (WANs) as well as public or private wireless networks. For example, both a given client 110 and database system 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client 110 and the Internet as well as between the Internet and database system 130. In some embodiments, clients 110 may communicate with the database system 130 using a private network rather than the public Internet. For example, a client 110 may be provisioned within the same enterprise as the database system 130 and/or the underlying system described herein. In some embodiments, a client 110 may communicate with the database system 130 entirely through a private network (e.g., a LAN or WAN that may use Internet-based communication protocols but which is not publicly accessible).

In some embodiments, the database system 130 may be configured to implement one or more service endpoints in a cloud-based service provider network. In some embodiments, the service provider network may provide a number of services using computing resources within the service provider network, such as storage services, virtual machine services, server-less execution services, machine learning services, and the like. The database system or service 130 may be configured to receive and process service requests, such as request 122, to access data within a database instance. For example, the request 122 may write a record or data item stored in a table maintained on behalf of clients/users by database system 130. In some embodiments, database system or service 130 may include hardware and/or software configured to implement various service endpoints and to receive and process HTTP-based web services requests. In some embodiments, database system 130 may be implemented as a distributed system (e.g., using a number of compute nodes in a cluster topology), which may implement a number of distributed data and system management techniques such as load balancing, data replication, dynamic scaling, auto-recovery from failures, etc.

As illustrated, the database system 130 may implement an interface 140, which may implement a user-facing interface, an API, or communication protocol for receiving database requests (such as request 122) and generating responses to the requests (such as error response 180). In various embodiments, interface 140 may be configured to support different types of requests. In some embodiments, the database system 130 may implement a NoSQL or non-relational database, where database requests (e.g. read and write requests) are not specified in the Structured Query Language (SQL). In some embodiments, database system 130 may be configured to implement a particular web services interface that supports a variety of operations on tables or indexes, or other data objects, that are maintained and managed on behalf of clients/users by the database system. The interface 140 provided by the database system 130 may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the interfaces described herein.

In some embodiments, the interface 140 may include APIs that allow users to perform updates on database objects (e.g., a CreateTable API and/or a DeleteTable API). In various embodiments, these APIs may invoke asynchronous workflows to execute the requested operation. In addition, the database may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table of index configurations or parameters, e.g., an UpdateTable API (which may be used to increase the provisioned throughput capacity for a given table), a PurchaseTableCapacity API (which may be used to increase the provisioned storage capacity for a given table or index), a SplitTable API (which may be used to explicitly invoke an operation to split a table or index or any of its partitions), or a MoveTable API (which may be used to explicitly invoke an operation to move one or more tables or indexes, partitions of a table, or partition replicas of a table).

In some embodiments, the database system 130 may provide an interface that includes support for some or all of the following operations on data maintained in a table by the database system on behalf of a database client: put (or store) an item, get (or retrieve) one or more items having a specified primary key or partition key, delete an item, update the attributes in a single item, query for items using an index, and scan (e.g., list items) over the whole table, optionally filtering the items returned. For example, the database system 130 may provide various data plane APIs for executing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

As shown, the database system 130 may be configured to accept a type of request 122, which may include a number of request parameters. As shown, the request 122 may specify one or more operations 124. The operations may indicate one or more data items as targets to be read or written. For example, in some embodiments, a data item may be identified using a key value, which is unique to that data item. In some embodiments, the request may specify a group of data items to be written, for example, by specifying one or more match criteria in a condition expression. The operation(s) 124 may also specify how the specified data items are to be modified, for example, by indicating new values for one or more attributes in the data items. In some cases, the operation 124 may specify the creation of a new data item, or the deletion of an existing item.

As shown, the request 122 may also specify one or more conditions 126 for the operations. In some embodiments, an individual condition 126 may be associated with the individual operation 124. The condition 126 may specify a condition that must be evaluate to true if the operation is executed. If the condition evaluates to false, an error response may be returned by the database system, such as error response 180. In some embodiments, the condition 126 may be specified using a condition expression to be evaluated against one or more attributes of a data item. The data item may be the data item that is the target of the operation, or in some embodiments, a different data item. In some embodiments, the database system 130 may provide conditional operations, such as conditional write operations, where the condition is specified as an attribute of the request 122, and where the condition is guaranteed to be evaluated atomically with the accompanying operation.

As shown, the request 122 may also specify one or more failure state return (FSR) indicators 128. In some embodiments, the FSR indicator(s) 128 may be associated with individual conditions 126. In some embodiments, the FSR indicator 128 may be specified as part of a conditional operation, and the database system may guarantee that any returned item state is obtained atomically at the time of the condition evaluation. In some embodiments, FSR indicator(s) 128 may include a flag that indicates whether the state of a data item (e.g. the data item evaluated by the condition) should be returned in the event of a condition failure. In some embodiments, the mere presence of the FSR indicator 128 may indicate to return the item state, and the lack of the FSR indicator 128 may indicate to not return the item state. In some embodiments, the FSR indicator 128 may include or be associated with additional parameters. For example, the FSR indicator 128 may indicate what data should be included in the returned item state. In some embodiments, the indicator 128 may indicate that all attributes of the data item that was evaluated should be returned as part of the item state. In some embodiments, the indicator 128 may indicate that only the evaluated attributes of the data item should be returned. In some embodiments, the indicator 128 may specify a list of attributes of the data item to be returned.

As shown, the request 122 may first be provided to a request parser 142, which may be configured to parse the request 122 into data objects that can be handled by the database system 130. In some embodiments, the parser may be configured to parse web services requests specified in a JSON format. In some embodiments, the request 122 may represent a request to execute a database transaction. In that case, the parser 142 may extract individual database operations from the transaction request. In some embodiments, the parser 142 may extract individual parameters from the incoming request 122, such as the operation(s) 124, the condition(s) 126, and the FSR indicator(s) 128.

As shown, once the request 122 is parsed (e.g., into a request object), the request information is provided to a write execution module or engine 150. In some embodiments, the database system 130 may include one or more storage nodes that implement the functionality to execute the operations. In some embodiments, a request router node may forward the request to the one or more storage nodes based on a load balancing policy.

As shown, in some embodiments, the write execution module 150 may implement a condition checker component 152, which may be responsible for evaluating the condition(s) 126 specified by the request. The evaluation may involve reading 162 the current state of one or more data item(s) 172 via an item state reader 154. As shown, in this example, the data item 172 is stored on storage 170, which may be a type of persistent storage. In some embodiments, the data item(s) 172 may be physically stored on a non-transitory storage device, but logically maintained in the database system 130 as part of a table, dataset, etc., which may be read or queried by the database system 130. After the state of the data item 172 is read, the condition checker 152 may then evaluate the data item's state with respect to the condition 126 to determine is the condition is satisfied.

As shown, if the condition is evaluated to pass 156, the write execution component 150 may then call an item writer 158 to execute the write 164 (or other specified operation) on the data item 172. In this example, the data item 172 that is the subject of the condition is also the data item being written by the request 122. In some embodiments, the write 164 may directly modify the data item on the storage 170. In some embodiments, the write 164 may simply involve a durable operation (e.g., writing a change log) that guarantees the write as part of the consistent state of the database going forward. As shown, in some embodiments, the read operation 162 and operation 164 may be executed as a single atomic action 160. For example, the read and write may be performed at a single logical point in time, so that no intervening operation on the data item 172 can occur between the read and the write. In some embodiments, this atomicity may ensure the correctness of the condition check. In some embodiments, the atomic action 160 may be implemented by locking the data item 172 to prevent it from being modified by other requests during the atomic action 160.

As shown, if the condition evaluates to fail 155, the data item 172 is not written via the item writer 158. In that case, the item state that read by the item state reader 154 and evaluated by the condition checker 152 is forwarded up to a response assembler 144. In this example, the response assembler is implemented as part of the interface 140. In some embodiments, the response assembler 144 may be configured to generate responses to requests such as request 122.

In some embodiments, the response assembler may receive input from other components in the database system 130 and then assemble that information into a response for the client 110. In some cases, the response may indicate an acknowledgement of a successful write (e.g., when the request condition(s) are verified). In some cases, the response may be an error response (e.g. error response 180), which may indicate a variety of error conditions that caused the request to fail. Depending on the embodiment, these errors include system errors (e.g., overloaded system), request errors (e.g., incorrectly formatted request), data errors (e.g., missing data item or table), permission errors, condition errors, or other types of errors.

As shown, in this example, an error response 180 is generated for the request 122 as a result of a condition check failure 182. In some embodiments, such an error response 180 may including an indication, such as an error code or message, that one or more of the condition(s) 126 has failed. In some embodiments, when this occurs, the request 122 is not executed.

Additionally, the error response 180 may indicate an item state upon condition failure 184. As discussed, in some embodiments, the request 122 may specify to return an item state of a data item at the time that the condition was evaluated to determine the condition failure. Accordingly, when this is indicated in the request, the response assembler 144 may include the item state in the error response 180. In some embodiments, the item state 184 may be provided in a JSON format, which may indicate the specified attribute value(s) of the data item that was evaluated. In this manner, the client 110 can obtain immediate feedback on the item state of the data item 172 that existed when the request 122 failed the condition check. The returned item state is guaranteed to be the state of the data item at the time of condition failure, because it was the same item state that was evaluated by the condition checker component 152 to determine the condition failure. Moreover, the item state 184 is only returned when the condition 126 fails, and only when the FSR indicator 128 requests the item state. Accordingly, the return of item states upon condition failures will not generate excessive network traffic.

FIG. 2 illustrates code for an example request and an example error response produced by a database system that returns an item state upon a condition failure, according to some embodiments. As shown, in this example, a request 210 sent to a database system is provided in a code format. The request 210 experiences a condition check failure 220 at the database system, which causes the database system to generate an error response 230. In this example, request 210 may be the request 122 of FIG. 1, error response 230 may be the error response 180 of FIG. 1, and the database system may be the database system 130 of FIG. 1.

As shown, the request 210 in this example is a request to update a data item in a table called "CheckingAccounts," as shown at line 212. As shown, the update request specifies an update to a particular data item in the table with the key value "Ganesh." As discussed, in some embodiments, data items or records in a table may be uniquely identified by a key attribute or a set of key attributes. In this example, the key attribute for the CheckingAccounts table is the "AccountID" attribute. The update request 210 thus specifies an update to the particular data item identified by the indicated key value. In this example, the "S" token indicates a type of the ensuing value, which is a string. As shown, the update decreases the value of the "Balance" attribute by an amount indicated by the variable ":amt," which is indicated be a number and has a value of 100.

As shown, the request 210 also specifies a condition for the update, which is shown at line 214. In this example, the update will only be executed if the condition (Balance >=:amt) is verified. As shown, the condition 214 is associated with an FSR indicator, which is shown at line 218 under the request parameter "ReturnValuesOnConditionFailure." In this example, the request specifies an explicit list of item attribute values to return, including the Balance and two other item attributes "LastWithdrawAmount" and "LastWithdrawMemo."

Depending on the embodiment, the request parameters for request 210 may vary. In some embodiments, the FSR indicator 218 may specify a subset of attribute values to return on condition failure. In some embodiments, attributes not specified in the FSR indicator 218 may not be included as part of the returned item state. In some embodiments, other attribute values, including attribute values of other data items, or even items from other tables. In some embodiments, the FSR indicator 218 may include an expression (e.g. a mathematical formula) that is computed from other values. In some embodiments, the FSR indicator 218 may be associated with a single condition. In some embodiments, a single FSR indicator may be associated with multiple conditions in the request. In some embodiments, the FSR indicator 218 may specify how the item state is returned. For example, the FSR indicator may indicate to include a request ID, a client ID, a condition ID, an evaluation timestamp, a warning level, etc., as part of the returned item state. In some embodiments, the FSIR indicator may specify to log the item state in a known log repository. In some embodiments, the database system may default to not return the item state upon failure, so that absence of an FSR indicator in the request will cause no item state to be returned on a condition failure. In some embodiments, the database system may be configured to always return item state upon a condition failure, unless it is overridden by the request.

As shown, the request 210 in this example also includes a "ReturnValues" parameter 216. In some embodiments, this parameter may be used to return the attribute values of the data item being written (here the "Ganesh" record), if the operation is successfully executed. Thus, in this example, if the requested update is successfully executed, all attribute values of the "Ganesh" record after the update will be provided in the response.

As shown, in this example, error response 230 is generated after the condition check 214 has failed. In this example, an "Error" object is returned in a coded format. The Error object includes a "Message" parameter at line 232, which may indicate a human-readable message that can be displayed on a user interface to indicate the error response. As shown, the error response 230 also includes a "Reason" parameter 234, which may include more details about the error. In some embodiments, the "Reason" parameter 234 may be machine-readable so that downstream components (e.g. the client) can take programmatic actions based on the parameter. As shown, the "Reason" parameter here includes an "Attributes" parameter at line 236. The "Attributes" parameter represents the returned item state that was specified by the request 210. In this example, the returned item state includes the attributes of "Balance," "LastWithdrawAmount," and "LastWithdrawMemo" at the time of the condition failure, as specified in the request 210.

Figure 3:
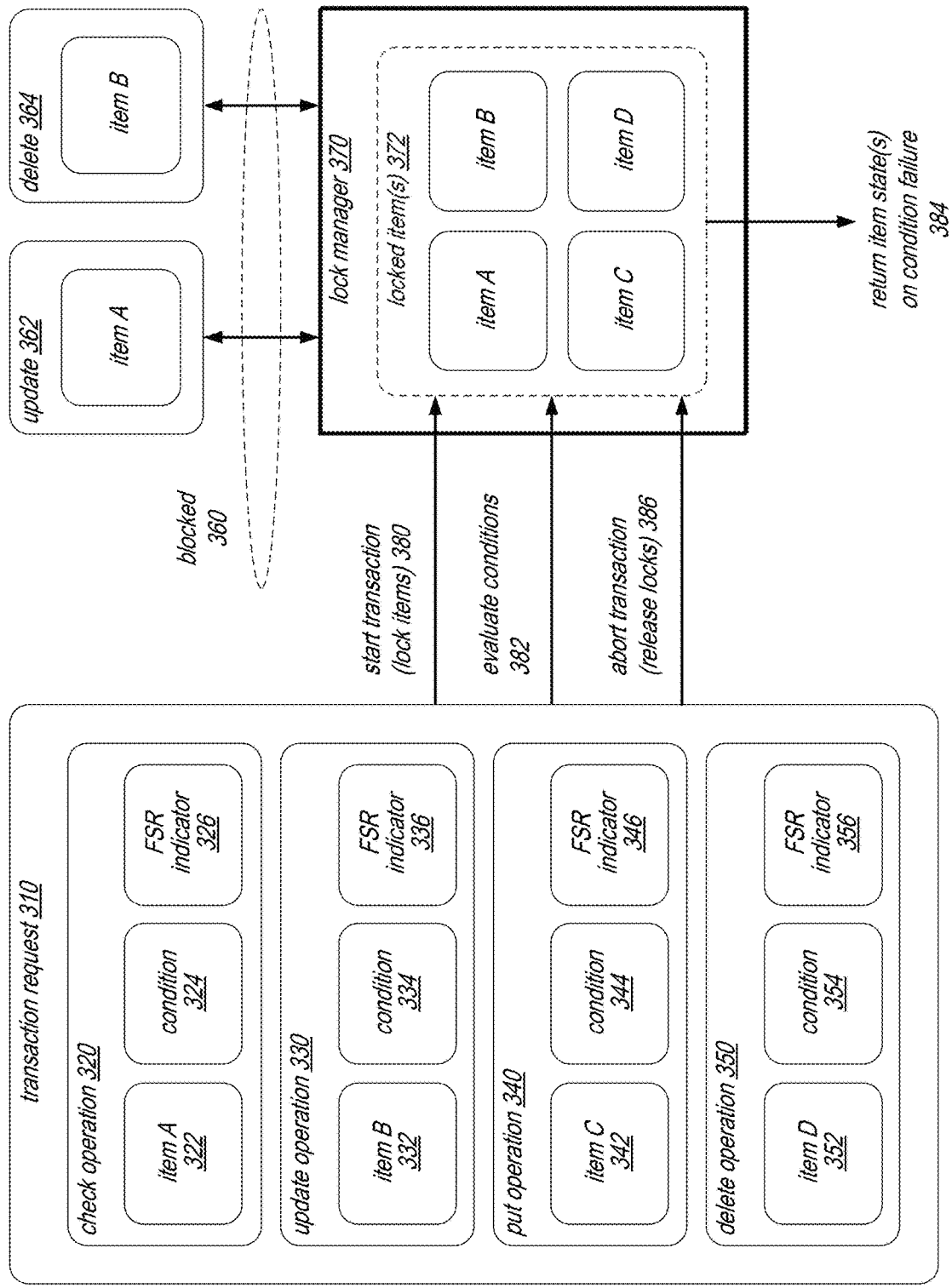
FIG. 3 depicts an example transaction request that requests return of item states upon different condition failures, according to some embodiments.

FIG. 3 depicts an example transaction request that requests return of item states upon different condition failures, according to some embodiments.

As shown, in this example, a transaction request 310 is processed by the database system (e.g., database system 130 of FIG. 1). In some embodiments, the transaction request 310 may be the request 122 of FIG. 1. In some embodiments, a database transaction may specify a set of database operations that are to be performed as an atomic unit. For example, the operations may all be performed at a single logical point in time, on a consistent state of the database. In some embodiments, the database system may guarantee that the consistent state of the database will not change during execution of the transaction. In some embodiments, the database operations in a transaction are performed in an all-or-nothing fashion, so that if any one database operation fails, the entire transaction will fail.

In this example, the transaction request 310 specifies four database operations. In some embodiments, a check operation 320 may perform a condition check 324 on data in the database. Thus, the check operation 320 may not involve a write to the database. In some embodiments, if the condition fails, the check operation 320 may cause the requested transaction to also fail. In this example, the check operation 320 evaluates a condition 324 on an item A 322, and if the condition 324 fails, the FSR indicator 326 indicates whether and/or what item state to report back to the client.

In some embodiments, an update operation 330 may be used to modify an existing data item in the database. Here, item B 332 is updated, if the condition 334 is verified. If not, the FSR indicator 336 indicates whether and/or what item state to report back to the client. In some embodiments, a put operation 340 may be used to add a new item to the database. Here, new item C 342 is being added, but only if condition 344 is verified. As discussed, in some embodiments, the condition 344 may evaluate a different data item in the database than the data item being written. If the condition 344 is not verified, the FSR indicator 346 indicates whether and/or what item state to report back to the client. In some embodiments, a delete operation 350 may be used to delete an item from the database. Here, item D 352 is being deleted, but only if condition 354 is verified. If the condition 354 is not verified, the FSR indicator 356 indicates whether and/or what item state to report back to the client.

Depending on the embodiment, the FSR behavior of the transaction may be specified in different ways. For example, in some embodiments, a single FSR indicator may be specified for multiple database operations or multiple conditions. In some embodiments, the transaction request may specify a global FSR indicator, which specifies the failure state return indicator for the entire transaction. In some embodiments, multiple FSR indicators in the transaction request may share common data (e.g. add item state to a common state object to be returned for the entire transaction). In some embodiments, the transaction may fail as soon as a first condition fails, and only the item state associated with the first condition is returned. In some embodiments, the transaction may evaluate all conditions, and the error response may possibly include item states for multiple failed conditions.

As shown, in some embodiments, the execution of the transaction request 310 may employ a lock manager 370. In some embodiments, in order to perform the requested transaction in atomic and consistent fashion, all items involved in the transaction (e.g. all item read or written) may be locked, so that other database operations outside of the transaction (e.g. update 362 and delete 364) are temporarily prevented or blocked 360 from modifying or reading these items. In some embodiments, the database system may execute transactions in a two-phase process. In some embodiments, a transaction manager may verify that all the conditions in the transaction request 310 are satisfied in a first phase (a preparation phase). Then, if all conditions are satisfied, the transaction manager may execute the database operations in a second phase (a write phase). In some embodiments, the write phase may involve a single operation (e.g. a single write to a log) that causes the all operations in the transaction to take effect at a single point in time. In some embodiments, the return of item states upon condition failure may be implemented using this locking mechanism.

As shown, in this example, the lock manager 370 may maintain a set of locked items 372 for the requested transaction 310, including items A, B, C, and D. In some embodiments, the items may be locked when the requested transaction is started at operation 380. As discussed, the lock manager 370 blocks other operations 362 and 364 from modifying (or in some embodiments reading) the locked items 372 during the transaction. At operation 382, while the items are locked, the conditions 324, 334, 344, and 354 are evaluated. Because the items are locked, the transaction checks can be performed without the possibility of any changes to the items 372. At operation 384, after a condition failure is detected, the locked items 372 may be used to generate the return states of the items, as requested by the transaction request 310. Because the items were locked at the start of the transaction, their states are guaranteed to be in a consistent state before any modifications are made by the transaction (i.e. before the write phase). Finally, at operation 386, after the item states are returned an error response to the transaction, the entire transaction is aborted, and all the item locks are released.

Figure 4:
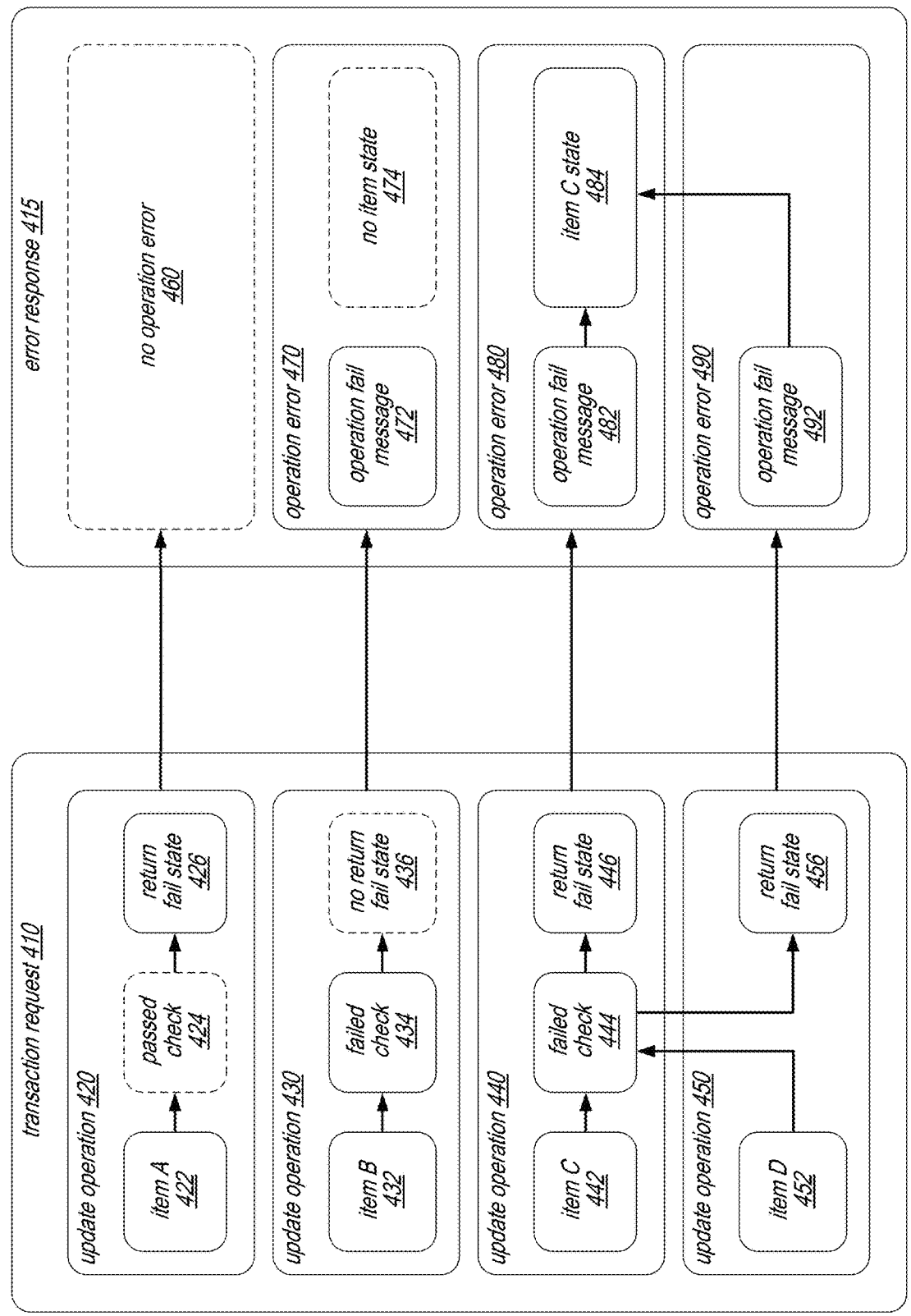
FIG. 4 depicts an example transaction request that requests return of item states upon different condition failures and an example error response, according to some embodiments.

FIG. 4 depicts an example transaction request that requests return of item states upon different condition failures and an example error response, according to some embodiments.

As shown, in this example, a transaction request 410 is submitted to a database system (e.g. database system 130 of FIG. 1). In this example, the transaction request 410 includes four update operations 420, 450, 440, and 450, which update four different items, item A 422, item B 432, item C 442, and item D 452, as shown. In some embodiments, the database system may only permit one operation for each unique data item in a given transaction. In some embodiments, this restriction simplifies how transactions are implemented in the database system (e.g., to simplify how operations are serialized during execution).

In some embodiments, the database system may provide a variety of semantic guarantees for transactions, which may be implemented by the transaction manager of the database system. For example, in some embodiments, a transaction request may be implemented as a synchronous operation that allows serializable update, put, delete, or check operations on multiple items in one or more tables atomically. In some embodiments, a single transaction request may include up to some maximum number of operations, one per item, where items can be across tables. In some embodiments, the database system may impose a maximum size on the items written in the transaction. In some embodiments, data items read or written in a transaction may be limited to part of the same accounts (or a same region of a database system). In some embodiments, the transaction manager of the database system may follow a request-response model. For example, it is not an asynchronous operation where a client has to submit a request and poll for a status. In some embodiments, the transaction manager or database system may guarantee that the transaction is executed atomically. In some embodiments, if operation condition on any item in the request does not hold true because of any reason (e.g. table's provisioned throughput is exceeded or any of the conditions associated with request fails), the request will be canceled. In some embodiments, the database system may impose a unique constraint on transactions, so that, for example, two operations (e.g. check and put) on the same item cannot be done in a single transaction. In some embodiments, the database system may provide an idempotency guarantee, where a request is idempotent for a period of time (e.g. 10 minutes). In some embodiments, if a request was completed within the time period with a same idempotent token it will return the same result. In some embodiments, the database system will reject an entire transaction request based on various constraints. For example, requests may be rejected if some or all of the following conditions exist: one or more tables sent in the request do not exist, one or more operations contain schema violations, two or more operations operate on the same item, the number of operations sent in the request is more than 10 or less than 1, any operation in the request would cause an item to become larger than 400 KB.

As shown, in this example, an error response 415 is generated for the transaction request 410. In some embodiments, as here, the error response 415 may indicate multiple operation errors 470, 480, and 490, which may correspond to the operations in the transaction request 410. In some embodiments, the transaction execution system may continue to evaluation all conditions in the request, even if the system has already determined that some conditions have failed.

As shown, update operation 420 passed its condition at operation 424. Accordingly, no operation error 460 is generated in the error response 415 for operation 420. This may be the case even if the request 410 has specified an FSR indicator for operation 420 to return the item state of item A upon a condition failure. Moreover, even though update operation 420 passed its condition check, item A is not updated, because it is part of a transaction that has other failed conditions.

As shown, update operation 430 has failed its condition at operation 434. However, the request 410 has specified that no failure state is to be returned for failure of this condition. In some embodiments, for example, the failure to include an FSR indicator for the condition in the request may indicate that no item state is to be returned. When this is determined at operation 436, an operation error 470 is generated in the error response 415, but no item state 474 is included in the operation error entry 470. In some embodiments, only other error metadata, for example, an operation failure message 472, may be included in the operation error entry 470. In some embodiments, the other error metadata may include an identifier for the operation or an identifier for the condition 434.

As shown, update operation 440 has also failed its condition check at 444. In this case, the request 410 has indicated that the item state (here for item C) should be returned in the event of the condition check failure 444. When this is determined at operation 446, another operation error entry 480 is generated in the error response 415. As shown, unlike error entry 470, error entry 480 includes the item state 484 of item C, as specified by the request 410. The item state 484 may include one or more attribute values of item C at the time of the condition check 444, as specified by the FSR indicator for update operation 440. As shown, the error entry 480 may also include an operation fail message 482, similar to error entry 470.

As shown, update operation 450 in this example is specified to rely on the same condition check 444 as operation 440. As discussed, in some embodiments, a single condition check may be used for multiple operations. For example, in the request 410, the update operation 450 may be specified to refer back to the condition for operation 440, using for example a condition ID. In some embodiments, the sharing of a condition among multiple operations may be achieved using a check operation, such as check operation 320 in FIG. 3. In this example, since that condition has failed at operation 444, update operation 450 will also fail. As a result, an error entry 490 is generated for operation 450. As shown, error entry 490 may include its own operation fail message 492, but refer back to error entry 480 for the item state data. Since the two operations failed based on the same condition check, the same item state for item C applies to both operations. In some embodiments, the state of item C may be reproduced in the error entry 490. In some embodiments, a pointer may be included in error entry 490 to refer back to the item state 484 provided in error entry 480.

FIGS. 5A and 5B illustrate code for an example transaction request and an example error response produced by a database system that returns an item state upon a condition failure, according to some embodiments.

As shown, FIG. 5A depicts a transaction request 510 specified in code. In some embodiments, transaction request 510 may be the request 122 of FIG. 1. As shown, the transaction request 510 is a request to perform a transaction of two database operations, and update operation specified in section 520 and a put operation specified in section 530.

The update operation 520 specifies an update operation to a table "Players." The row or data item to be updated is identified by the key value ":player," which is defined to be the value "Eric." As shown at line 522, the update operation updates the "Team" attribute of the item to a team ("Cowboys"), but only if a condition is verified. As shown, the condition in this case checks that the current row (for player "Eric") has a Team attribute that is NULL (or unassigned value) and an Age attribute with value of greater than 18. As shown at line 524, if the condition check fails, an item state of the row for "Eric" is reported back. In this case, the token "ALL_CHECKED" indicates that all attributes in the row that were used to evaluate the condition (i.e., the Team and Age attributes) are to be returned as the item state. In some embodiments, attribute values not specified in the "ALL_CHECKED" subset may be excluded from the returned item state.

The put operation 530 specifies an insertion of a new item or row in the "Teams" table. The put operation also specifies a condition check at line 532, which checks that no row or item exists in the Teams table with "Eric" as the Player attribute. In this example, each player may only belong to one team. Thus, if "Eric" already exists in the Teams table, the put operation should fail. The put operation 530 also specifies FSR indicator at 534. Here, if the condition check at line 532 fails, all old values of the offending row are to be returned as the item state. That is, if an existing row associated with "Eric" is found in the table, all attribute values of that row before any modifications will be returned as the item state causing the condition failure.

FIG. 5B depicts a transaction response 540 in code, which is generated as a result of transaction request 510. As shown, in this case, Eric is already assigned to a team, and as a result, the item states of the offending rows in both the Players and Teams tables are returned. In section 550 for a first error entry, the item state causing the failure of the first condition (condition 522) is returned. As shown, the item state indicates that the Players table indicates that Eric is already assigned to the team "Bears" and has an age of 25. The "Bears" value causes the first condition to fail, because this means that the Team attribute in that item is not NULL.

Section 560 is shown for a second error entry. This error entry is generated for failure of the second error condition (condition 532). As shown, error entry 560 includes, at line 562, an item state of an existing row in the Teams table with value "Eric" for the PlayerID. As indicated in the request 510, all attribute values for this item are to be returned as the item state. Accordingly, values for all item attributes (e.g., TeamID, PlayerID, Position, and JoinDate) are included in the response 540.

Figure 6:
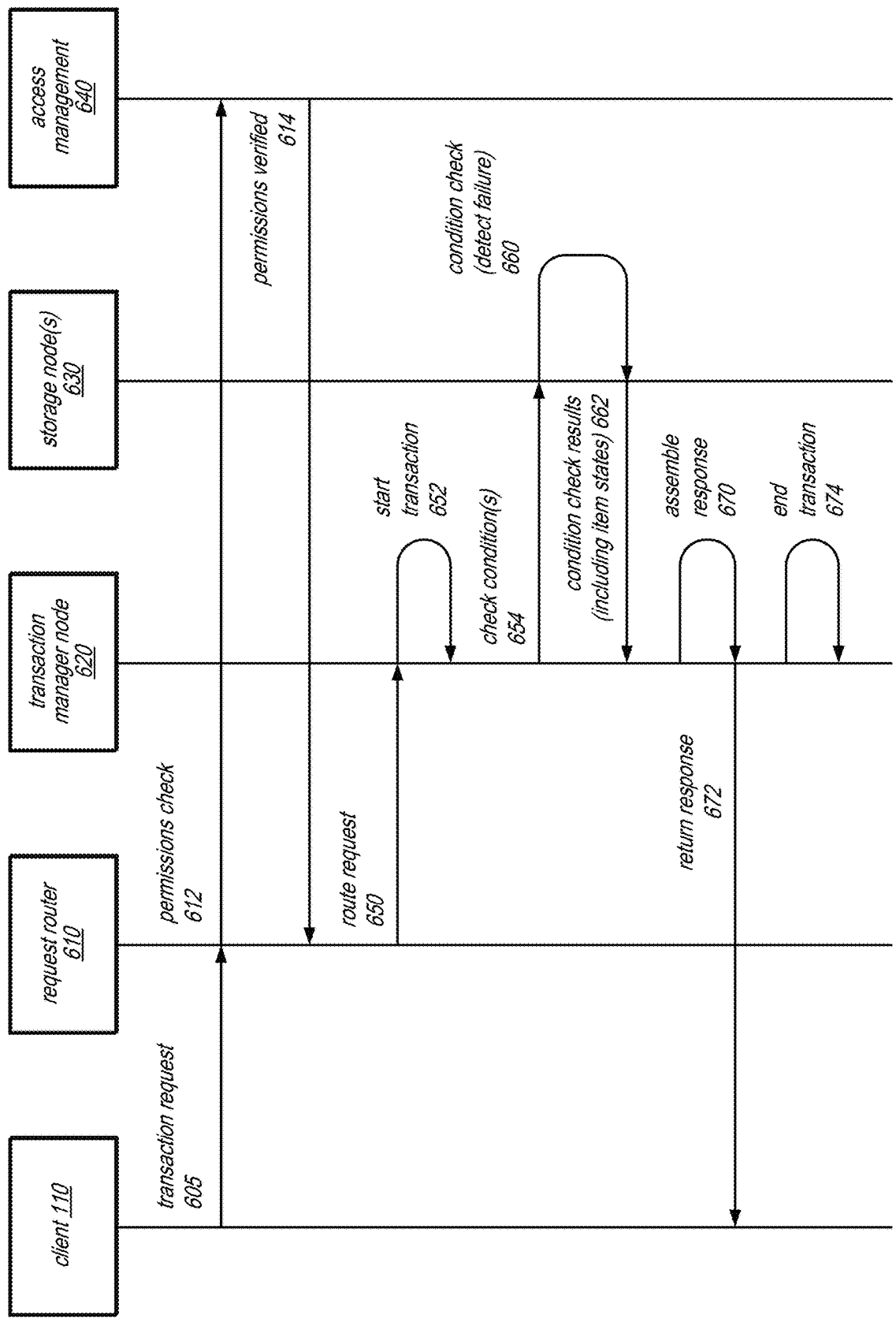
FIG. 6 is a system sequence diagram illustrating interactions between components of a database system to handle a transaction request that causes a condition failure, according to some embodiments.

FIG. 6 is a system sequence diagram illustrating interactions between components of a database system to handle a transaction request that causes a condition failure, according to some embodiments.

As shown, the figure depicts the client 110 sending a transaction request 605 to a database system, which may be the database system 130 of FIG. 1. In this example, the database system includes four components, the request router 610, a transaction manager node 620, one or more storage node(s) 630, and an access management component 640. In some embodiments, one or more of these components may be implemented outside of the database system, such as for example the access management component 640. As discussed, in some embodiments, the database system 130 may be implemented as a database service hosted to a service provider network, and the access management component 640 may be a separate system or service in the service provider network that is shared by a number of services. Moreover, in some embodiments, the database system may be implemented as a distributed database using a cluster of computing nodes. The nodes may serve different functions such as request routing, transaction management, and data storage. In some embodiments, these nodes may be virtual machine instances. In some embodiments, the service provider network may manage these virtual machine instances to ensure high availability of the database and dynamically scale the database according to observed demand.

As shown, the transaction request 605 is initially received by a request router 610. In some embodiments, the request router 610 may select a transaction manager node 620 or storage node 630 to handle the request. In some embodiments, the request router 610 may select the node in order to load balance work among the nodes. In some embodiments, the request router 610 may perform a parsing of the incoming request 605, to make certain initial determinations about how the request is handled. For example, the request router 610 may determine that the request 605 is a transaction request, and thus, select a transaction manager node 620 to handle the request.

In some embodiments, as shown, the request router 610 may also be responsible for checking permissions for the request via the access management system 640. In some embodiments, the request may include parameters that indicate an identity of the client 110 that issued the request. The client 110 may be registered with the access management system 640, which may also maintain access permissions and/or roles for the client. For example, the client 110 may have been previously granted certain permissions to read or write a table in the database.

In some embodiments, the request router 610 parse the request to determine the client that issued the request, the various database operations in the transaction request, the database objects that are accessed by the operations, etc. At operation 612, the request router 610 may send this information or use this information to perform a permission check 612 for the request with the access management system. In this example, the access management system 640 verifies the permissions for the request at operation 614, and the request router 610 will allow the request to proceed. In some embodiments, the verification may provide one or more access keys that allows the request to be executed. In some embodiments, if the permissions cannot be verified, the request router 610 may drop the request and report an access denied error to the client 110. In some embodiments, if the permissions cannot be verified, the request may still be processed. However, no item state will be returned on condition failure if the required permissions do not exist for the client 110. In some embodiments, the checking of permissions may not be performed initially, but rather during the execution of the transaction. In some embodiments, the checking of permissions may be performed by a component other than the request router 610.

In some embodiments, the permissions needed by the transaction request may include individual permissions for each database operation. For example, in some embodiments, each database object may be associated with a read and a write permission. In some embodiments, the ability to receive the item state upon a condition failure from a database object is associated with a distinct permission. This distinct permission may be separate from the normal permission to read or write a table in the database system. Thus, in some embodiments, the request router 610 may recognize that a particular database operation in the transaction request is specified with an FSR (failure state return) indicator, and check the access management system 640 to verify that the client is authorized to receive the failure state information.

At operation 650, the request router routes the request to a transaction manager node 620. As discussed, in some embodiments, the database system may include a pool of transaction manager nodes, and the request router may select one transaction manager node from the pool to handle individual transaction request.

At operation 652, the transaction manager node 620 starts the transaction 652. In some embodiments, the starting of the transaction may include identifying the data items or database objects accessed by the transaction, and locking these resources so that they cannot be modified by other operations in the database. In this manner, all of the operations in the transaction can be executed atomically.

At operation 654, the transaction manager sends requests to one or more storage nodes 630 to check the conditions specified in the transaction request. In some embodiments, the transaction manager 620 may execute the transaction in two phases. In a first preparation phase, the transaction manager may check that the conditions in the request are satisfied. In some embodiments, if any of the conditions fail, the transaction may be aborted. If all condition checks are evaluated to pass, a second write phase of the transaction may be executed, to modify the database data according to the operations in the transaction. In some embodiments, the transaction manager node 620 may select a number of different storage nodes 630 to evaluate different conditions, and there may be a number of interactions between the transaction manager and the storage nodes. In some embodiments, the storage nodes 630 may be selected by the transaction manager 620 based on their assigned role in the database. In some embodiments, a group of storage nodes may be selected for a particular database object. In some embodiments, a group of storage nodes may be selected for a particular partition of data (e.g. a particular key range) in a database object.

In this example, one or more conditions of the transaction request fails. As shown, at operation 660, one or more storage nodes 630 performs the conditions checks and detects a failure of a condition check. At operation 662, this failure is reported back to the transaction manager 620. In some embodiments, the condition check results 662 may include the item state that were evaluated that caused the condition checks to fail. In some embodiments, depending on what was specified in the FSR indicators in the transaction request, additional state data may be returned with the condition check results 662.

Once the transaction manager receives information about a condition failure, at operation 670, the transaction manager 670 assembles an error response back to the client. In some embodiments, this operation may be performed using response assembler 144 of FIG. 1. In some embodiments, the assembly process may involve adding to the response all requested item states associated with failed conditions, as specified in the transaction request. At operation 672, the error response is returned back to the client. In some embodiments, the return may be performed via the request router 610. In some embodiments, the transaction manager node 620 may respond directly back to the client 110.

At operation 674, the transaction manager node 620 may end the transaction. In some embodiments, ending the transaction may involve releasing any resource locks (e.g. data item locks) that were acquired at the start of the transaction. Accordingly, other operations are once again able to access the resources (e.g. data items) in the database. In some embodiments, operation 674 may also record in a log that the transaction was aborted and the reasons for the abort.

Figure 7:
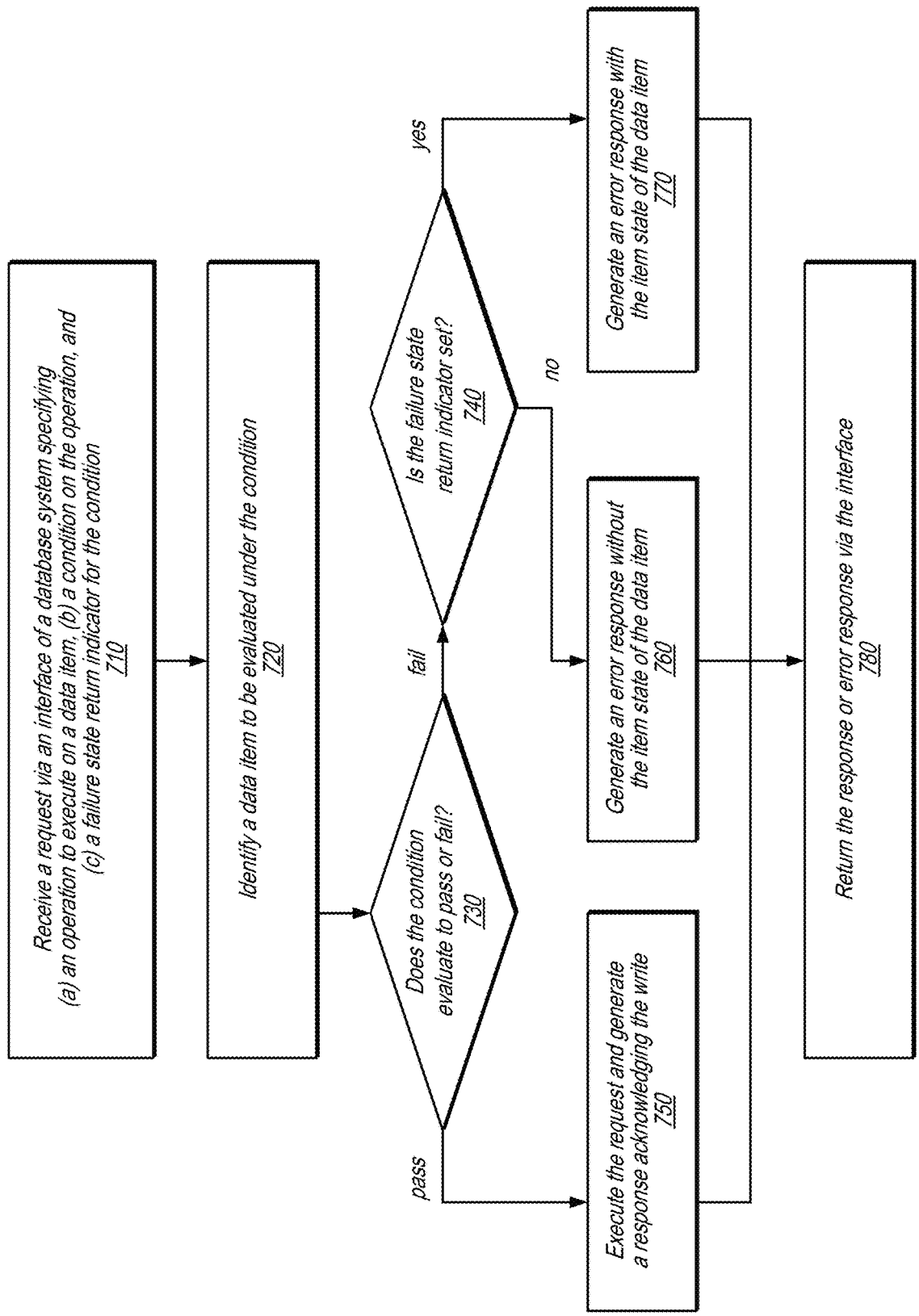
FIG. 7 is a flowchart illustrating a process of generating a response to a request in a database system that returns an item state upon a condition failure, according to some embodiments.

FIG. 7 is a flowchart illustrating a process of generating a response to a request in a database system that returns an item state upon a condition failure, according to some embodiments. In some embodiments, the depicted process may be performed by a database system, for example, the database system 130 of FIG. 1.

The process begins at operation 710, where a request is received via an interface of a database system specifying (a) an operation to execute on a data item, (b) a condition on the operation, and (c) a failure state return indicator for the condition. In some embodiments, the request may be request 122 of FIG. 1, and the interface may be interface 140 of FIG. 1. In some embodiments, the request may be a request to execute a transaction of multiple database operations. In some embodiments, individual database operations in the transaction may include its own condition and associated FSR indicator. In some embodiments, execution of the operation may be dependent on the condition. For example, the operation may only be executed if the condition evaluates to true, based on a state of the data item. As discussed, the FSR indicator may indicate whether to return an item state (e.g. state of a data item that was evaluated) associated with the condition upon a failure of the condition. In some embodiments, the FSR indicator may indicate which data item attributes should be returned as part of the item state.

At operation, a data item to be evaluated under the condition is identified. In some embodiments, this operation may involve parsing the request, for example, via a request parser 142, and then analyzing the results to determine the data item to be evaluated. For example, in some embodiments, the condition may specify a unique key value that uniquely identifies a data item in a table. In some embodiments, the data item that is to be written or read by the request is the same data item that will be evaluated under the condition. In some embodiments, the data item to be written may be different from the data item to be checked. In some embodiments, the request may specify a criterion that identifies a set of data items to be written, and each data item in the set may be checked under the condition.

At operation 730, a determination is made whether the condition passes or fails for the data item. In some embodiments, this operation may be performed by reading the current state of the data item, for example, using the item state reader 154 of FIG. 1. The retrieved item state may then be evaluated under the condition. In some embodiments, the item may be locked during the execution of the request, so that the evaluated condition cannot be changed between the reading of the item state and the evaluation of the condition. If the condition passes, the process proceeds to operation 750. If the condition fails, the request is not executed and the process proceeds to operation 740.

At operation 750, if the condition check passes, the request is executed, and a response is generated acknowledging the execution of the request. In some embodiments, the request may be a write request executed using the item writer 158 of FIG. 1. In some embodiments, the checking and writing may be performed as a single atomic condition operation. In some embodiments, the request may specify to return the item state after a successful completion of the write, and the acknowledgement response may be generated to include the item state information.

At operation 740, if the condition check fails, another determination is made whether the FSR indicator is set. That is, the database system determines whether the FSR indicator indicates to return the item state upon the condition check failure. In some embodiments, the FSR indicator may include a Boolean value that indicates whether the item state is to be returned. In some embodiments, the presence of the FSR indicator may indicate to return the item state, as illustrated by the FSR indicator 218 in FIG. 2. In some embodiments, the FSR indicator may be used to override the default behavior of the database system to return item states upon condition failures. If the FSR indicator is not set, the process proceeds to operation 760. If the FSR indicator is turned on, the process proceeds to operation 770.

At operation 760, an error response is generated. The error response may indicate that the request has failed due to a condition check failure, but does not include the item state of the data item that was evaluated for the condition. In some embodiments, not returning such information on all condition failures will reduce network traffic between the database system and the client and also computing resource usage for both the database system and the client. In some embodiments, the item state information may only be obtained by certain clients that has the appropriate permissions.

At operation 770, an error is generated that includes the item states of the data item. In some embodiments, the item state may include a list of attribute values of the data item that are specified in the request, for example, as part of the FSR indicator. In some embodiments, only the attributes that were checked by the condition may be included. In some embodiments, all attribute values of the data item may be included as part of the returned item state. In some embodiments, the item state may include other information such as certain metadata about the data item (e.g., its last modification time, the last modifying user, etc.).

As shown, operation 780 follows from operations 750, 760, and 770 to return the generated acknowledgment response or error response via the interface. The response may be provided in a specified format that is expected by the client, for example, as shown in FIGS. 2 and 5B. Where the item state is returned for a condition failure, the database client may use item state to investigate the reason for the request failure, or display or log the request for a user.

Figure 8:
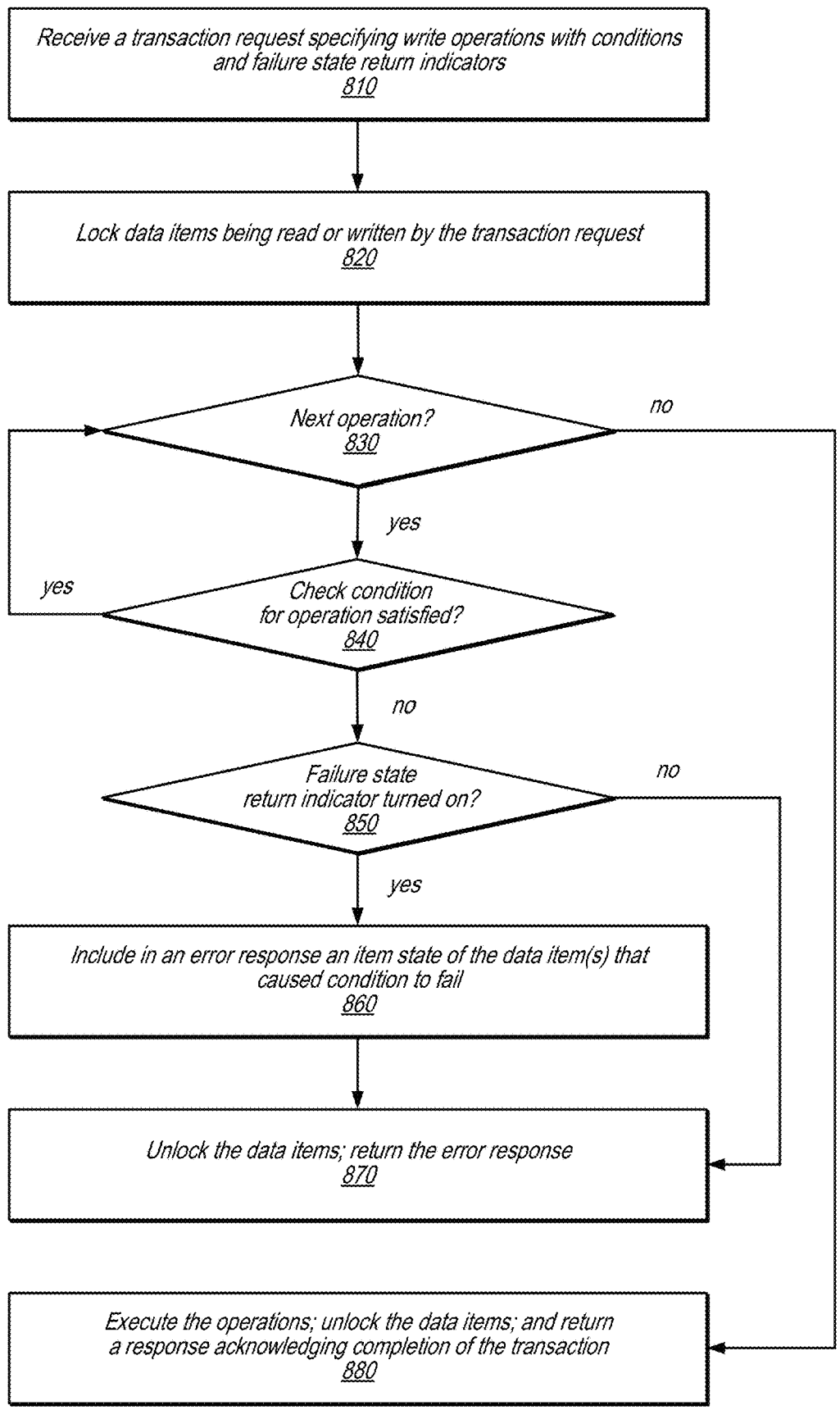
FIG. 8 is a flowchart illustrating a process of handling a transaction request at a database system that returns an item state upon a condition failure, according to some embodiments.

FIG. 8 is a flowchart illustrating a process of handling a transaction request at a database system that returns an item state upon a condition failure, according to some embodiments. In some embodiments, the depicted process may be performed by a database system, for example, the database system 130 of FIG. 1.

At operation 810, a transaction request is received specifying operations with conditions are failure stat return indicators. In some embodiments, the transaction request may be received via an interface of the database system, for example, interface 140 of FIG. 1. The transaction request may be, for example, transactions requests 310, 410, 510, or 605, as discussed in connection with previous figures. In some embodiments, the database requests in the transaction may be performed in an all-or-nothing fashion, and in a single logical point in time. In some embodiments, the database operations may include operations to update, put, or delete data items in the database. In some embodiments, the database operations may include a check operation that reads one or more data items to verify conditions, without modifying the data in the database. In some embodiments, individual database operations may be associated with its own condition and FSR indicator.

At operation 820, data items being read or written by the transaction request are locked. In some embodiments, the locking may occur on all such data items at the same time, so that the transaction can begin at a consistent state of the database. In some embodiments, the locking may be performed by a lock manager, such as lock manager 370, or a transaction manager, such as transaction manager 620. In some embodiments, the locking will prevent other database operations from modifying the locked data items. In some embodiments, the item states that may be returned upon failed condition checks will be obtained from these data items while they are locked.

Operation 830 implements a loop, where each database operation in the transaction is processed. Thus, as shown, the process will iterate over all data items in the transaction, until these is no longer a "next" operation. At that point, the process will proceed to operation 880. The process may also terminate at operation 870, if some condition is evaluated to fail. In this example, the transaction execution will stop immediately if a condition is failed, so that subsequent conditions are not processed. However, in some embodiments, the transaction execution may evaluate all conditions in the transaction even after multiple conditions have evaluated to fail.

At operation 840, a condition is evaluated on a database operation to determine whether the condition is satisfied. In some embodiments, the check may be performed in similar fashion as discussed for operation 730 in FIG. 7. If the condition is satisfied, the process loops back to operation 830 for the next operation in the transaction. If the condition is evaluated to fail, the process proceeds to operation 850.

At operation 850, another determination is made whether a failure state indicator is turned on for the condition. In some embodiments, this operation may be performed in similar fashion as discussed for operation 740 in FIG. 7. If the FSR indicator is turned on the process proceeds to operation 860. If the FSR indicator is not turned on, the process proceeds to operation 870.

At operation 860, an item state of data item(s) that caused the condition failure is added to an error response for the requested transaction. In some embodiments, this operation may be performed by the response assembler 144 of FIG. 1 and/or in similar fashion as discussed for operations 670 of FIG. 6. In some embodiments, the generated error response may include an error entry for the operation, which may indicate a list of attribute values that were used to evaluate the condition, as shown in the transaction response 540 in FIG. 5B.

At operation 870, the data items used by the transaction request are unlocked, and the error response is returned. In some embodiments, unlocking the data items allows the data items to be modified (or in some embodiments read) by other database operations after the transaction has finished executing. In some embodiments, the unlocking may be performed in similar fashion as operations 386 of FIG. 3. The error response may then be returned to the client via the interface, either with or without the item state. As discussed, the interface allows the item state to be returned only when there is a condition failure, and only when it is requested by the client. In this manner, the FSR feature does not introduce excessive data traffic to database communications when the item state information is not needed.

Operation 880 represents an error-less exit to the transaction request, where no conditions have failed. In that case, the transaction request is executed, the data items are unlocked, and an acknowledgment response is returned. In some embodiments, the actual carrying out of the transaction operations may be executed in a write phase of the transaction, which may occur after a first preparation phase, where the conditions are evaluated. When all conditions are evaluated to pass, the write phase can be performed under locked state, so that the operations are executed atomically. In some embodiments, the write phase may be performed via a single write to a change log. In some embodiments, the transaction request may also specify to returned the item state of certain data item upon a successful completion of the transaction. In that case, the acknowledgment response may be generated to include such item state information.

Figure 9:
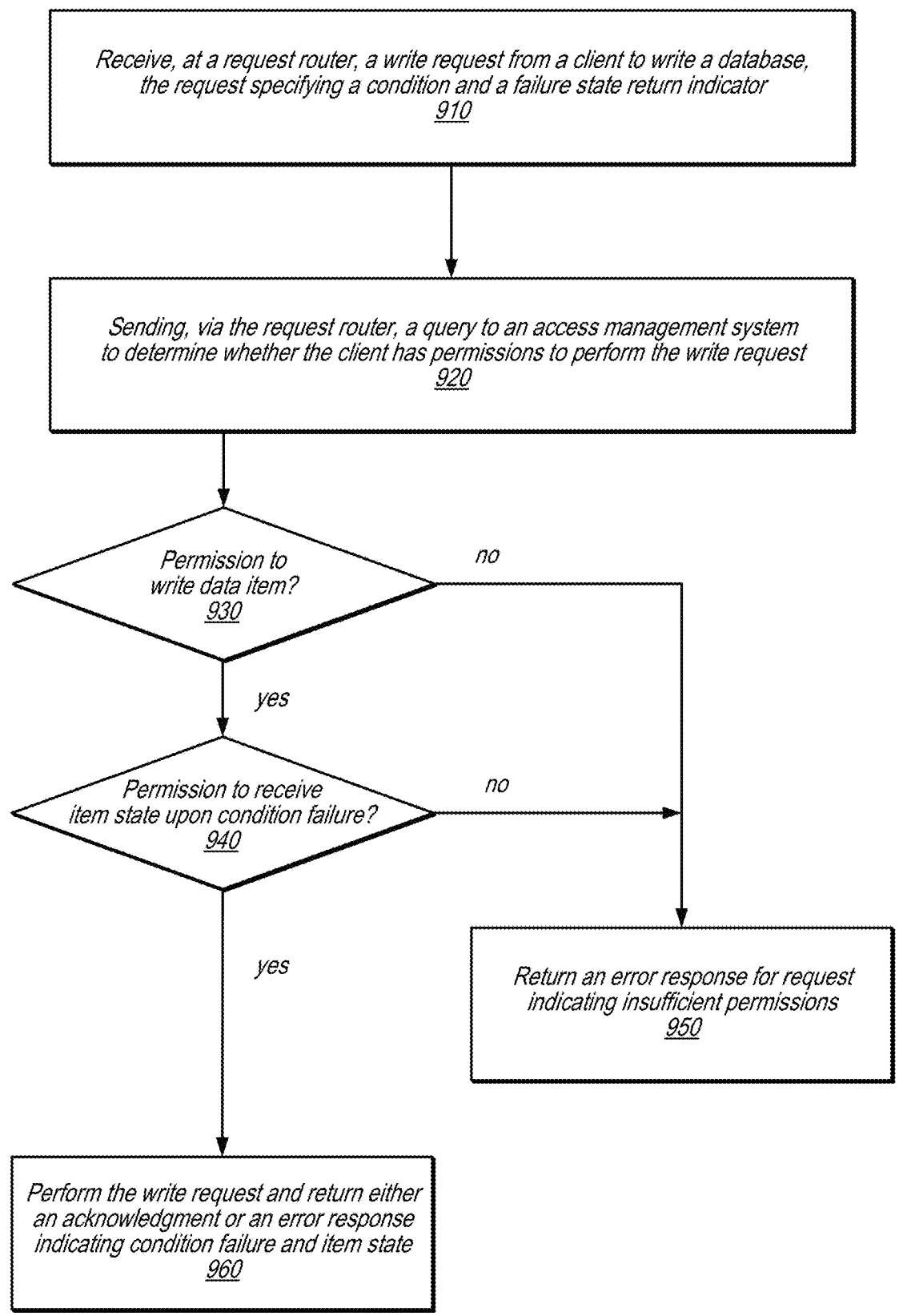
FIG. 9 is a flowchart illustrating a process of checking permission for a request that specifies a return of item state upon a condition failure, according to some embodiments.

FIG. 9 is a flowchart illustrating a process of checking permission for a request that specifies a return of item state upon a condition failure, according to some embodiments. In some embodiments, the depicted process may be performed by a database system, for example, the database system 130 of FIG. 1.

The process begins at operation 910, where a request from a client of a database is received at a request router. The writes request is to write a database, and specifies a condition to evaluate before the write and a failure state return indicator to return an item state in the event of a condition failure. In some embodiments, the request router may be request router 610 of FIG. 6. In some embodiments, the database system may be a distributed database with multiple compute nodes, and the request router may forward requests to individual nodes in order to load balance the nodes. In some embodiments, the request may be received according to an interface of the database such as interface 140 of FIG. 1. The request may be, for example, request 210 of FIG. 2 or transaction request 510 of FIG. 5.

At operation 920, the request router sends a query to an access management system to determine whether the client has permissions needed to execute the request. In some embodiments, the access management system may be access management system 640 of FIG. 6, and the permission checking may be performed in similar fashion as operations 612 and 614, as discussed. In some embodiments, the permission checking may be performed by a entity or component other than the request router. In some embodiments, the access management system may be implemented as a separate system from the database system, for example, as a separate identity and access management (IAM) system. In some embodiments, the query may return a response indicating whether permission to execute the request is granted or denied. In some embodiments, the response may provide an access key to execute the request if permission for the request is granted.

At operation 930, a determination is made whether permission exists to write a data item specified by the request.

In some embodiments, write permission to a database may be specified on a per-object basis. In some embodiments, write permissions may be more granular, allowing a user to write only particular types of data items, particular attributes of data items, under particular circumstances, etc. For example, in some embodiments, users may be granted only a certain number of operations per time period or only a throughput level of writes, before excessive writes are throttled. If write permission does not exist, the process proceeds to operation 950. If write permission exists, the process proceeds to operation 940.

At operation 940, another determination is made whether there is permission to receive the item state specified in the request in the event of a condition failure. In some embodiments, the permission to receive the item state upon a condition failure may be a separate permission from the write permission or read permission associated with the data item. In some cases, not all user who can write a data item are allowed to receive item state data, which may encompass a broader set of data attributes than the attributes being written. In some embodiments, only particular users (e.g. developer or system administrators) may have the privileges to receive such item state data. In some embodiments, these permissions must be verified to exist before the request is executed, even though the return of the item state may only occur conditionally. If the permission to receive item state data does not exist, the process proceeds to operation 950. If the permission to receive item state data exists, the process proceeds to operation 940.

At operation 950, if either of the two permissions at 930 or 940 does not exist, the request will be failed. An error response will be returned indicating that the client does not have sufficient permissions to execute the request. In some embodiments, the error response may employ a similar format as shown in FIG. 2 or 5B, but with a different type of error code. In some embodiments, the request may be executed even if permissions do not exist to receive the items state. However, in that case, no item state will be returned upon condition failure.

At operation 960, if both permissions 930 and 940 are verified to exist, the request is executed. Depending on the outcome of the condition check, the database system may return either an acknowledgment response or an error response indicating that there is a condition check failure. As discussed, the error response may also include the item state at the time of the condition check failure. In some embodiments, operation 960 may be performed in similar fashion the processes depicted in FIG. 7 or 8.

Figure 10:
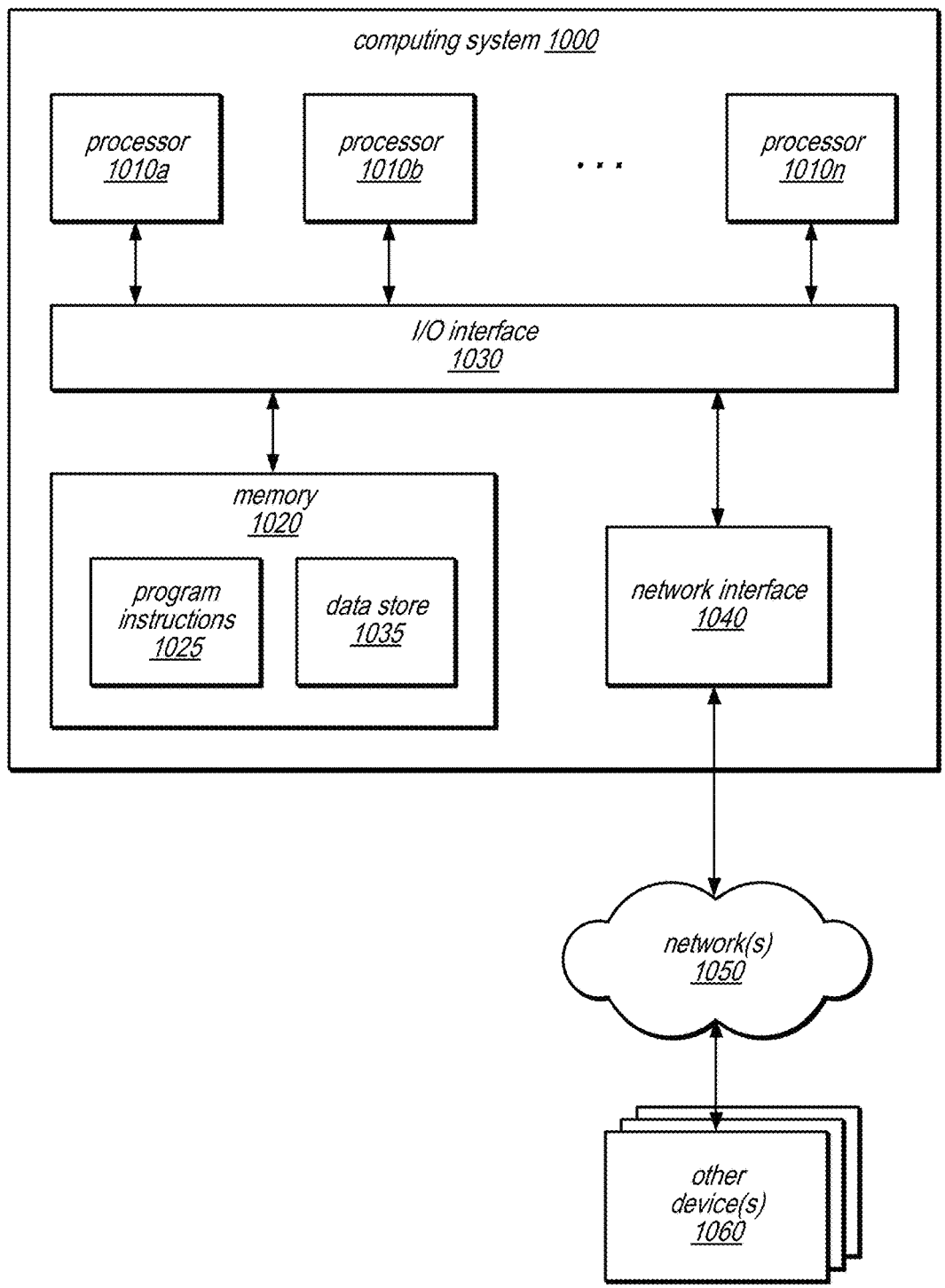
FIG. 10 is a block diagram illustrating an example computer system that can be used to implement one or more portions of a database system that implements an interface to return an item state upon a condition failure, according to some embodiments.

FIG. 10 is a block diagram illustrating an example computer system that can be used to implement one or more portions of a database system that implements an interface to return an item state upon a condition failure, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 920, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising:
a database system implemented by one or more computers, configured to:
provide a transaction interface configured to accept requests to execute transactions on a database, the requests specifying:
(a) a set of one or more operations to execute for one or more respective data items, wherein the set of one or more operations in the requests are to be executed atomically on a consistent state of the database,
(b) at least one condition for at least one of the one or more operations, wherein execution of the one operation is dependent on the one condition, and
(c) at least one failure state return (FSR) indicator, wherein the FSR indicator indicates whether to return an item state of at least one of the one or more data items upon failure of the one condition;
responsive to a request for a transaction received via the transaction interface, and as part of execution of the transaction:
determine that a data item associated with an operation specified in the request fails a condition specified for the operation;
determine whether an FSR indicator associated with the operation is set;
generate an error response for the request indicating failure of the condition, wherein the error response includes an item state of the data item if the FSR indicator is set, and does not include item state if the FSR indicator is not set; and
return the error response via the transaction interface.

2. The system of claim 1, wherein:
the transaction interface is configured to accept transaction requests that specify a subset of attributes of the data item to return as the item state; and
to generate the error response, the database system is configured to include values of the subset of attributes of the data item as the item state, but not values of other attributes of the data item not in the subset.

3. The system of claim 1, wherein the transaction interface is configured to accept transaction requests that specify a plurality of FSR indicators for respective ones of a plurality of conditions.

4. The system of claim 1, wherein database system is configured to lock all data items to be read or written by the request during execution of the transaction, wherein the locking prevents the data item from being changed by operations outside the transaction.

5. The system of claim 1, wherein database system is configured to:
verify with an identity and access management (IAM) system that a client that issued the request has a permission to receive the item state of the data item, wherein the permission is distinct from a write permission for the data item, and wherein the database system is configured to not return the item state of the data item if the permission is not verified.

6. A computer-implemented method, comprising:
performing, by a database system:
receiving, via an interface of the database system, a request to read or write one or more data items in a database, wherein the request specifies (a) a condition for an operation on a data item, and (b) a failure state return (FSR) indicator indicating whether to return an item state of the data item upon a failure of the condition;
responsive to the request and during execution of the request:
determining that the data item associated with the operation fails the condition;
determining that the FSR indicator is set;
generating an error response for the request indicating the failure of the condition, wherein the error response is generated to include the item state of the data item based at least in part on the determination that the FSR indicator is set; and
returning the error response via the interface.

7. The method of claim 6, further comprising:
receiving a second request via the interface, wherein the second request specifies a second condition on a second data item;
determining that the second data item fails the second condition;
determining that a second FSR indicator associated with the second request is not set; and generating and returning a second error response indicating the failure of the second condition, wherein the second error response is generated to not include the item state of the second data item based at least in part on the determination that the second FSR indicator is not set.

8. The method of claim 6, wherein the database system is hosted on computing resources operated by a network-accessible service provider network, and the interface is a web service interface.

9. The method of claim 6, wherein the database system is a non-relational database system and the interface is a non-relational database interface.

10. The method of claim 6, wherein:
the request specifies a subset of attributes of the data item to return as the item state; and
generating the error response comprises including values of the subset of attributes of the data item as the item state, but not values of other attributes of the data item not in the subset.

11. The method of claim 6, wherein:
the request specifies a subset of attributes of the data item to evaluate for the condition; and
generating the error response comprises including values of the subset of attributes of the data item as the item state, but not values of other attributes of the data item not in the subset.

12. The method of claim 6, wherein:
the request specifies a transaction including a plurality of operations to be executed atomically on a consistent state of the database;
execution of at least some of the operations is dependent on respective conditions specified in the request; and
at least some of the conditions are specified with respective FSR indicators that indicate whether to return respective item states upon condition failure.

13. The method of claim 6, wherein:
the request specifies a check operation to check a particular condition of a particular data item without writing any data items; and
the particular condition is associated with a particular FSR indicator that indicate whether to return a particular item state upon the failure of the particular condition.

14. The method of claim 12, further comprising performing, by the database system:
evaluating the request to verify that the transaction does not include multiple operations that write a single data item, wherein detection of multiple operations that write a single data item causes the database system to fail the transaction.

15. The method of claim 12, further comprising performing, by the database system:
locking all data items to be read or written by the request during execution of the transaction, wherein the locking prevents the data item from being changed by operations outside the transaction.

16. The method of claim 6, further comprising performing, by the database system:
verifying with an access management system that a client that issued the request has a permission to receive the item state of the data item, where the permission is distinct from a write permission for the data item, and wherein the database system is configured to not return the item state of the data item if the permission is not verified.

17. One or more non-transitory computer-accessible storage media storing program instructions that when executed on or across one or more processors of a database system cause the database system to:
receive, via an interface of the database system, a request to read or write one or more data items in a database, wherein the request specifies (a) a condition for an operation on a data item, and (b) a failure state return (FSR) indicator indicating whether to return an item state of the data item upon a failure of the condition;
responsive to the request and during execution of the request:
determine that the data item associated with the operation fails the condition;
determine that the FSR indicator is set;
generate an error response for the request indicating the failure of the condition, wherein the error response is generated to include the item state of the data item based at least in part on the determination that the FSR indicator is set; and
return the error response via the interface.

18. The non-transitory computer-accessible storage medium of claim 17, wherein:
the request specifies a transaction including a plurality of operations to be executed atomically on a consistent state of the database;
execution of at least some of the operations is dependent on respective conditions specified in the request; and
at least some of the conditions are specified with respective FSR indicators that indicate whether to return respective item states upon condition failure.

19. The non-transitory computer-accessible storage medium of claim 18, wherein the program instructions when executed cause the database system to:
lock all data items to be read or written by the request during execution of the transaction, wherein the locking prevents the data item from being changed by operations outside the transaction.

20. The non-transitory computer-accessible storage medium of claim 17, wherein the program instructions when executed cause the database system to:
verify with an access management system that a client that issued the request has a permission to receive the item state of the data item, where the permission is distinct from a write permission for the data item, and wherein the database system is configured to not return the item state of the data item if the permission is not verified.

\* \* \* \* \*